United States Patent [19]

Kohn et al.

[11] Patent Number: 5,261,063

[45] Date of Patent: Nov. 9, 1993

[54] PIPELINE APPARATUS HAVING PIPELINE MODE EECUTING INSTRUCTIONS FROM PLURAL PROGRAMS AND PARALLEL MODE EXECUTING INSTRUCTIONS FROM ONE OF THE PLURAL PROGRAMS

[75] Inventors: Jack W. Kohn, San Jose, Calif.; Jacob White, Arlington, Mass.

[73] Assignee: IBM Corp., Armonk, N.Y.

[21] Appl. No.: 624,438

[22] Filed: Dec. 7, 1990

[51] Int. Cl.⁵ .............................................. G06F 9/38
[52] U.S. Cl. ...................................... 395/375; 395/800; 364/231.8; 364/232.9; 364/261.9; 364/DIG. 1
[58] Field of Search ........................... 395/375, 800

[56] References Cited

U.S. PATENT DOCUMENTS

| | | | |
|---|---|---|---|
| 4,075,688 | 2/1978 | Lynch, Jr. et al. | 395/800 |
| 4,589,067 | 5/1986 | Porter et al. | 364/200 |
| 4,620,275 | 10/1986 | Walloch et al. | 364/200 |
| 4,665,479 | 5/1987 | Oina et al. | 364/200 |
| 4,677,547 | 6/1987 | Omoda et al. | 364/200 |
| 4,794,524 | 12/1988 | Carberry et al. | 364/200 |
| 4,812,970 | 3/1989 | Kitamura et al. | 395/375 |
| 4,858,105 | 8/1989 | Kuriyama et al. | 395/375 |
| 4,916,652 | 4/1990 | Schwartz et al. | 364/748 |
| 4,926,323 | 5/1990 | Baror et al. | 395/375 |
| 5,001,627 | 3/1991 | Sakamoto | 395/375 |
| 5,050,068 | 9/1991 | Dollas et al. | 395/375 |
| 5,099,421 | 3/1992 | Buerkle et al. | 395/375 |
| 5,148,529 | 9/1992 | Ueda et al. | 395/375 |

Primary Examiner—Robert B. Harrell
Assistant Examiner—Alpesh M. Shah
Attorney, Agent, or Firm—Herb Somermeyer

[57] ABSTRACT

A pipeline data processor is simultaneously operable in a pipeline mode, a parallel mode and a vector mode which is a special case of the pipeline mode. Each pipeline stage has its own stage program counter. A global program counter is incremented in the pipeline mode. The instruction addresses generated in the global program counter are distributed to those pipeline stages which first become available to perform pipelined data processing. Any given pipeline stage may dynamically switch between pipeline mode and a parallel mode in which the stage program counter counts and supplies instruction addresses independently of any other pipeline stage. A vector mode uses pipeline instructions which are repeated to enable any number of the pipeline stages to participate in vector calculations. In the vector mode, one pipeline instruction address is held in the global program counter to be repeatedly supplied to respective first available pipeline stages until the vector calculations are completed. Other program means are disclosed which effect efficient control of program executions in all three modes and enable the concurrent execution in any mode by any of the pipeline stages.

20 Claims, 5 Drawing Sheets

| INSTRUCTION TYPE | | EXECUTING PROCESSOR(S) |
|---|---|---|
| NO. | TYPE | |
| I1 | PIPELINE TO PARALLEL BRANCH | P1-1 |
| I2 | PIPELINE TO PARALLEL BRANCH | P2-1 |
| I3 | PIPELINE TO PARALLEL BRANCH | P3-1 |
| I4 | PIPELINE | P4-1 |
| I5 | PIPELINE (LD GLOBAL INDEX WITH 4) | P5-1 |
| I6 | PIPELINE TO PARALLEL BRANCH | P6-1, P4-2, P5-2, P1-4 |
| I7 | PIPELINE | P3-4 |
| I8 | PIPELINE | P6-4 |
| I9 | PIPELINE | P3-5 |
| I10 | PIPELINE | P4-5 |
| I11 | PIPELINE | P5-5 |
| I12 | PIPELINE | P6-5 |
| I13 | PIPELINE | P2-6 |
| I14 | PIPELINE | P3-6 |
| I15 | PIPELINE | P4-6 |
| I16 | PIPELINE | P5-6 |
| I17 | PIPELINE | P6-6 |
| I18 | PIPELINE | P1-7 |
| *(PARALLEL SUBPROGRAM 1)* | | |
| I19 | PARALLEL | P1-2 |
| I20 | PARALLEL TO PIPELINE RETURN | P1-3 |
| *(PARALLEL SUBPROGRAM 2)* | | |
| I21 | PARALLEL | P2-2 |
| I22 | PARALLEL | P2-3 |
| I23 | PARALLEL | P2-4 |
| I24 | PARALLEL TO PIPELINE RETURN | P2-5 |
| *(PARALLEL SUBPROGRAM 3)* | | |
| I25 | PARALLEL | P3-2 |
| I26 | PARALLEL PIPELINE RETURN | P3-2 |
| *(VECTOR SUBROUTINE)* | | |
| I27 | PARALLEL | P6-2, P4-3, P5-3, P1-5 |
| I28 | PARALLEL TO PIPELINE RETURN | P6-3, P4-4, P5-4, P1-6 |

FIG. 5

PIPELINE APPARATUS HAVING PIPELINE MODE EECUTING INSTRUCTIONS FROM PLURAL PROGRAMS AND PARALLEL MODE EXECUTING INSTRUCTIONS FROM ONE OF THE PLURAL PROGRAMS

FIELD OF THE INVENTION

The present invention relates to data processing systems, particularly to those systems employing pipelined processing elements or stages.

DISCUSSION OF THE PRIOR ART

Pipelined processors, or "pipelining", have been used to obtain high performance at lower costs. In a pipelined system, the execution of a machine instruction is divided into a number of execution stages such that several machine instructions can be effectively simultaneously executed. The cycle time of a pipelined processor is determined by the longest executing stage rather than by total instruction execution time. Examples of pipelined systems are found in U.S. Pat. Nos. 4,794,542; 4,589,067; 4,620,275 among other teachings too numerous to mention.

To keep a pipelined system efficient, instruction executions must be started before other instruction executions are completed; otherwise various processing stages in the pipeline are idle. This latter situation is known as "pipeline breakage." Such breakage is often caused by data dependencies for instruction execution. i.e. a given instruction may need the results of a prior instruction; such prior instruction has not been executed to provide such data until after the given instruction is ready to enter the pipeline of instruction execution. In this situation, the pipeline stages become idle until the required data is made available.

Pipeline breakage can be reduced by using a vector instruction set wherein each vector instruction causes a particular operation to be repeated for each element of the vector. Since the respective instruction executions which cause operations on the vector elements are performed on different elements, the problem of data dependencies is removed. The price paid for selecting a vector instruction set is that a same operation has to be performed on all elements of the vector. There are instances in numeric processing that the operation to be performed is not always the same for all elements of a vector. That is, a scalar operation must now be performed rather than a vector operation.

Based on the above facts, some existing machines employ vector instruction sets to avoid the breakage problem because each vector operation can specify many calculations with no result dependencies. Although most numeric applications inherently have significant parallelism, it is not always of a vector type where the same computation is performed on many elements of data. Circuit simulation is one example of this requirement. The programmed device models have data dependent branches so that not only do the different device types require different calculations but two different devices of the same type may require different calculations as a function of their current modelled operating state.

Another known approach to avoid pipeline breakage is to use the pipeline for simultaneously executing a plurality of programs which are interleaved for execution in the pipeline. U.S. Pat. No. 4,589,067, supra, U.S.-pat. Nos. 3,728,692 and 4,229,790 all show such an arrangement. In this arrangement, if there are eight stages for executing instructions, there can be up to eight programs simultaneously executed with the data dependencies being limited to the respective instruction streams of the eight programs. In the example, every eighth instruction entering the pipeline is from one of the eight programs being executed. This arrangement, in effect, makes the pipeline look like eight independent processors. In such solutions to the pipeline breakage problem, electronic circuits are usually added to such processors for tracking the multiple instruction streams for interleaving same into the pipeline. This latter arrangement is referred to herein as "parallel operations or parallel mode".

Many numeric applications use a diversity of computational algorithms. Execution of the various algorithms, within one program or set of programs, usually can be made most efficient by using different program execution strategies, such as set forth above in the cited references and as briefly described herein. What is needed is a means and method for enabling usage of the pure pipeline operations, vector operations, or parallel operations to efficiently execute any numeric application which requires more than one of the three above-described approaches. In practicing the present invention, which provides for satisfying the needs of the three approaches, significant performance improvements are available.

SUMMARY OF THE INVENTION

It is an object of this invention to enable dynamic switching between and executing parallel pipeline, vector and parallel operations in pipelined data processing apparatus.

It is another object of this invention to enable the reduction of pipeline breakage in a pipelined data processing apparatus.

In accordance with certain aspects of the present invention, apparatus is provided in a pipeline which enables each of the stages in the pipeline to operate in diverse modes of operation for achieving a dynamically changeable mode of operation between pipeline mode, vector mode and parallel mode. The switching preferably occurs at or about instruction fetch times for the respective pipeline stages or processors. All three types of operations can be simultaneously occurring in a pipeline.

Each stage of the pipeline has its own independent program counter. The pipeline itself has a global program counting means. The global program counting means provides instruction addresses to the stages currently operating in a pipeline or vector modes while the stages operating in or parallel mode employ their respective program counting means. Communication means are provided for enabling signalling program status between the stage and the global program counting means. A one of the communication means is primarily used for enabling vector operations. It is preferred that the data used in any of the operations be stored in a shared data storage unit; instructions are preferably stored in a shared instruction storage unit. Switching stages between the three modes of operations is effected by programmed means; specifically, in a particular form of the invention, special branch or jump instructions effect switching the modes of operation of the stages. Coding the special branch instructions into programs to be respectively executed in the pipeline, vector or parallel mode enables switching the stages between the three modes. The vector mode is indicated by information stored in a so-called index register which is accessible by any of the stages. In a preferred form of practicing the invention, the machine is initialized and begins operation in the pipeline mode from which the other modes may be selected for any of the pipeline stages.

The foregoing and other objects, features, and advantages of the invention will be apparent from the following more particular description of preferred embodiments of the invention, as illustrated in the accompanying drawings.

DETAILED DESCRIPTION

Figure 1:
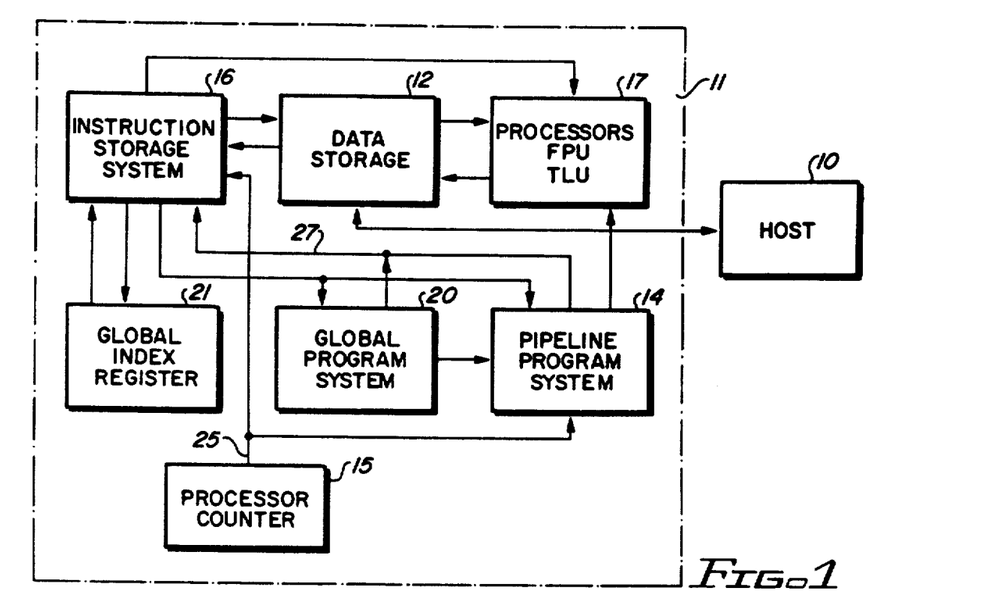
FIG. 1 is a simplified block diagram of a pipeline numerical processor which illustrates a preferred embodiment of the invention.
Figure 3:
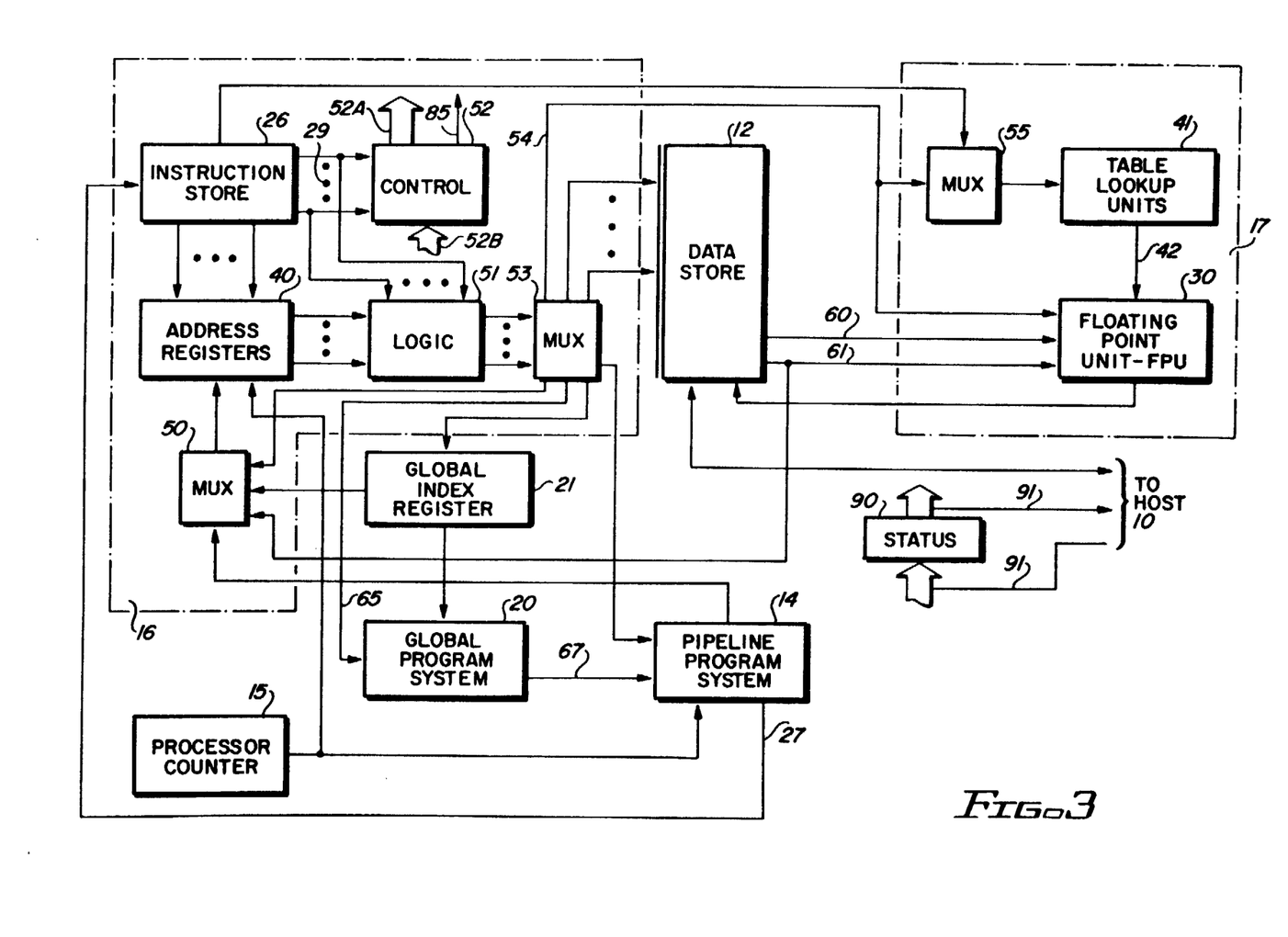
FIG. 3 is a simplified data flow diagram illustrating data flow for the FIG. 1 illustrated processor.
Figure 4:
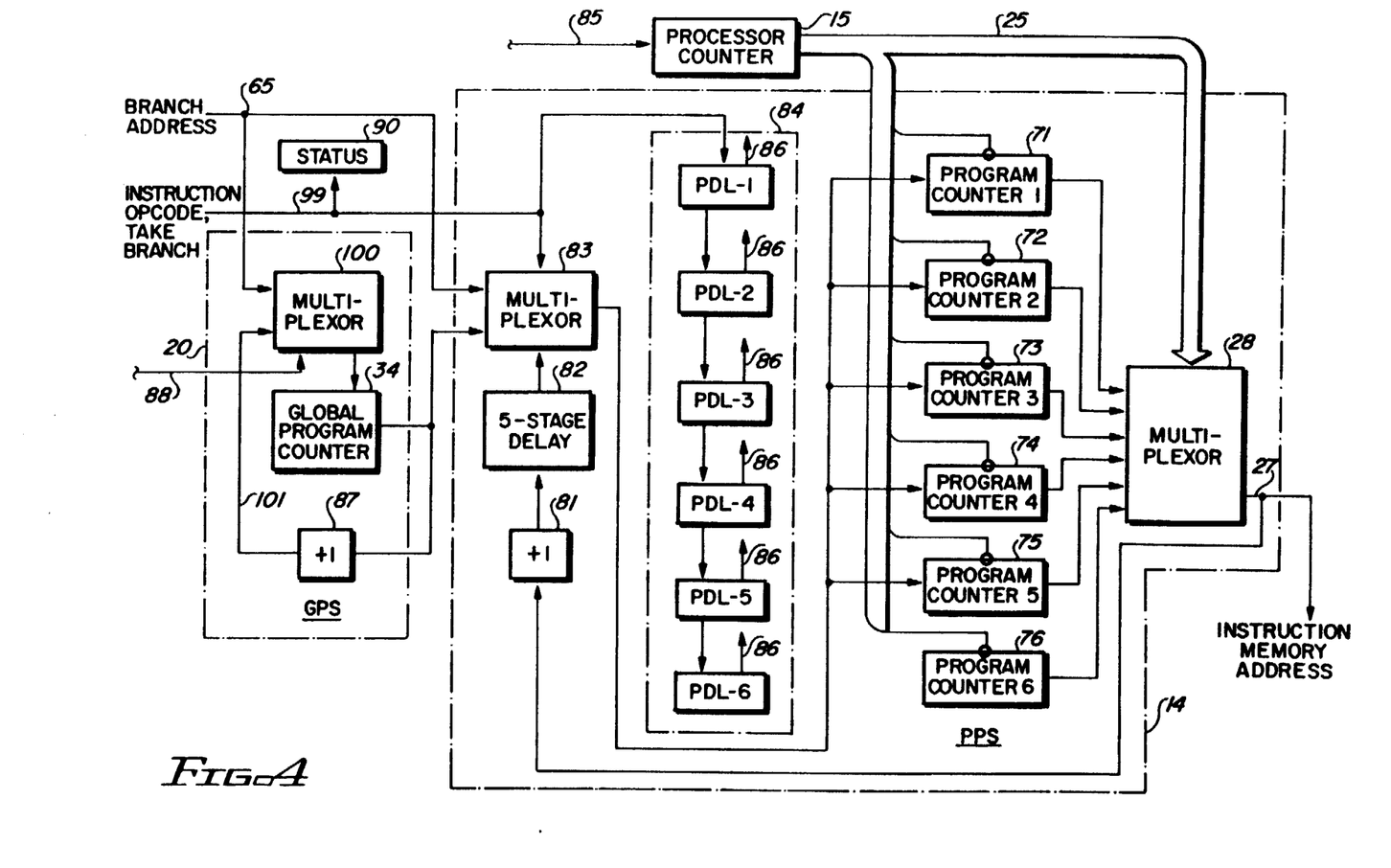
FIG. 4 illustrates program control means used in the FIG. 3 illustration.

Referring now more particularly to the appended drawing, like numerals indicate like parts and structural features in the various figures. A general purpose processor, such as an IBM PS2 or RISC computer, is a host 10 for the pipeline apparatus 11. Data storage unit 12 is shared between host 10 and apparatus 11 for providing communication between the two data processors. Typical message procedures are used for these communications. Host 10 provides the supervisory operations while apparatus 11 does the specialized numeric processing amenable to pipeline functions. Apparatus 11 includes a pipeline program system 14 which includes later-described program counting means and other controls, as shown in FIG. 4. The usual processor or stage counter 15 cycles the pipeline and indicates the processor or stage selection to instruction storage system 16. The actual numeric processing is performed by special processors 17, which in one embodiment included a floating point unit (FPU) and a table lookup unit (TLU) 41(FIG. 3). Processors 17 operations are time sliced between the pipeline stage program counters 71-76 creating pipeline stages, i.e. virtual processors each of which have predetermined time slices of processors 17 and one of the stage program counters 71-76.

In accordance with the invention, the pipeline program system 14 includes later described program counting means for each of the pipeline stages, plus a global program system 20 which cooperates with the pipeline program system 14 for enabling program-effected or dynamic switching between and concurrent pipeline, vector and parallel operations through pipeline program system 14. Global index register 21 enables control of vector operations, as will become apparent. The instruction storage system 16 responds to requests for instructions in a usual manner for pipelined apparatus. System 16 also communicates with the global index register 21. The global program system 20 has a plenary pipeline and vector control over pipeline program system (PPS) 14 and is instrumental in switching from pipeline operations to either parallel or vector operations. The program execution in either the parallel or vector modes effect mode switching for the pipeline stage executing in such modes back to the pipeline mode.

Figure 2:
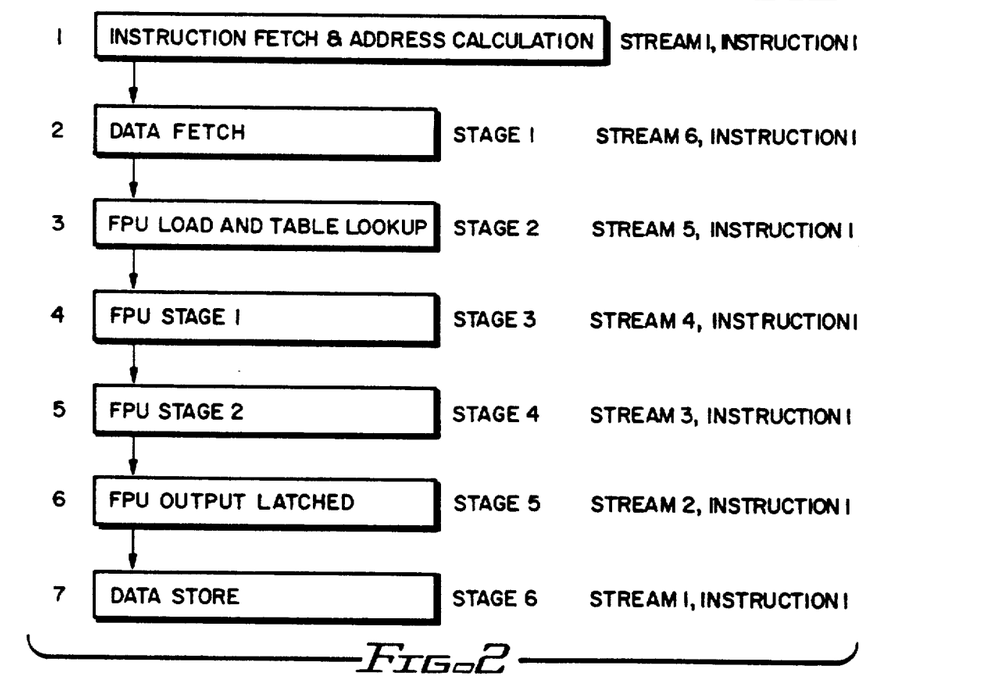
FIG. 2 shows operation of a typical pipeline executing in a parallel mode.

FIG. 2 illustrates a parallel mode of operation for one operation cycle of a pipeline. This figure is a time "snapshot" of execution of six instructions from six different programs or instruction streams. Shown are six stages of pipeline, the figure shows seven steps so that one instruction stream 1 is shown with two instructions. Pipeline interleaving of the pipelined instruction stream is round-robin, such as enabled by a processor counter 15. The term "stream" indicates which of the six programs or instruction streams are being used, "instruction" indicates the relative instruction number in the respective instruction streams, and the labels in the boxes 1-7 respectively indicate what machine operation is being performed, box number 2 indicating the first stage, etc, through box number 7 (hereafter box 7) which is the last operation in the pipeline for executing an instruction. Box 1 indicates the instruction fetch prior to the instruction execution being started in the pipeline. The box 1 represented operation occurs concurrently to the operation represented by box 7. The labels in the boxes 2-7 respectively indicate the machine operations performed by the stages in executing an instruction. Box 2 represents stage 1, the pipeline entry stage, which effects a data fetch for instruction 1 of stream or program 6. Concurrently thereto, stage 2, represented by box 3, executes the second pipeline step for instruction 1 of instruction stream 5, etc through stream 1 instruction 1 at box 7. From FIG. 2 it is seen that the pipeline appears as six "virtual processors". The time slicing of processors 17 is apparent from inspection of boxes 4-6. The arrangement is such that at box 7, the data is stored at box 7 when the instruction fetch for the second instruction of the instruction stream 1 next executing instruction 2. This selection prevents pipeline breakage, assuming that all six instruction streams are truly independent. This arrangement also requires multiple program counting means, one for each of the instruction streams, a processor counter 15 and a multiplexor for the multiple program counting means to fetch instructions. In the pipeline mode, all six concurrently executing instructions are in the same instruction stream. In accordance with the present invention, the parallel, vector and pipeline modes may simultaneously occur in the pipeline. For example, boxes 2, 4, and 6 (pipeline stages 1, 3 and 5 respectively) execute an instruction in the pipeline mode while the remaining pipeline stages are executing instructions in the parallel mode.

FIG. 3 illustrates the data flow within the FIG. 1 illustrated system. All of the instructions for all modes of operation have the same format, shown in FIG. 7. Most of the machine operations done by the instructions are the same. This description with reference to FIG. 3 details the machine operations used to execute an instruction. Whenever the operations are different for the different types of instructions, the details of such differences are described later in connection with each such instruction.

Processor Selection

A first step in executing an instruction is to select the processor that will be executing the instruction. Processor counter 15 indicates by its count supplied over count bus 25 to pipeline system 14 which of the processors or stages in the pipeline system is to be used for the next instruction to be executed. The counting is continuous to effect a round-robin selection of the stage processors (program counters 71-76, as described above) within every pipeline cycle.

Instruction Fetch

Once a stage processor (pipeline stage) is selected, its stage program counter (FIG. 4) addresses the instruction store 26 through multiplexor 28 (FIG. 4) thence over address bus 27 to fetch the next instruction in its instruction stream. The instruction address also travels from bus 27 to address incrementer 81 for incrementation for the next following instruction address during a current phase of the pipeline cycle. Five stage delay circuit 82 receives the incremented addresses for transmittal through multiplexor 83 to the stage program counter 71-76 indicated by processor counter 15.

The mode of operation for the respective pipeline stages is determined by the instruction currently being executed by that pipeline stage. The current mode of instruction execution is also stored in the pipeline delay latches PDL, a shift register 84 having shift register stages PDL-1 through PDL-6. A clock signal supplied over line 85 from control 52 indicates the end of each pipeline execution phase (six indications per pipeline cycle) which increments processor counter 15 and shifts the contents of shift register 84 one position. At the beginning of each pipeline execution phase (box 1 of FIG. 2), the opcode on line 99 sets PDL-1 stage of shift register 84 to indicate the mode of the current instruction being fetched, i.e. pipeline or parallel. Vector operations are effected through the pipeline instructions pipeline calculate, pipeline branch or pipeline set global flag while index register 21 has a count greater than one. The next clock indication on line 85 shifts the contents of PDL-1 to PDL-2 in synchronism with processor counter 15 and the operation of the pipeline stages including the time-sliced portions of processors 17. In this manner the mode, pipeline or parallel, follows the instruction execution in the pipeline, the shift register bits PDL-1 through PDL-6 indicating the mode to all components in the pipeline apparatus used in instruction execution as collectively indicated by arrows 86. Multiplexor 83 also responds to the shift register 84 PDL mode indications to select either the incremented instruction address supplied through five stage delay 82 in the parallel mode or the instruction address currently stored in global program counter 34 in the pipeline mode. Multiplexor 100 responds to the lines 86 mode indications to selectively pass the incremented global program counter 34 contents received from incrementer 87, all as described with respect to the definitions of the instructions used in the pipeline and parallel modes and the vector indication of global index register 21 inhibiting multiplexor 110 from passing the increment global instruction address as indicated by a signal on line 88. When the contents of global index register 21 is greater than unity, then irrespective of the mode of the current instruction, multiplexor 100 is inhibited from passing the global program counter 34 incremented address from incrementer 87. When the contents of global index register 21 is equal to one, then the instruction mode indicated by shift register 84 controls multiplexor 100 to effect incrementation of or hold the current instruction address in global program counter 34. Incrementation of the global program counter 34 occurs during box 1 of FIG. 2, the instruction fetch, i.e. is effected through the onset of the execution of the currently executing instruction right after the opcode is decoded, multiplexor 100 being enabled or not by the opcode of the current instruction.

Address Calculation

Figure 7:
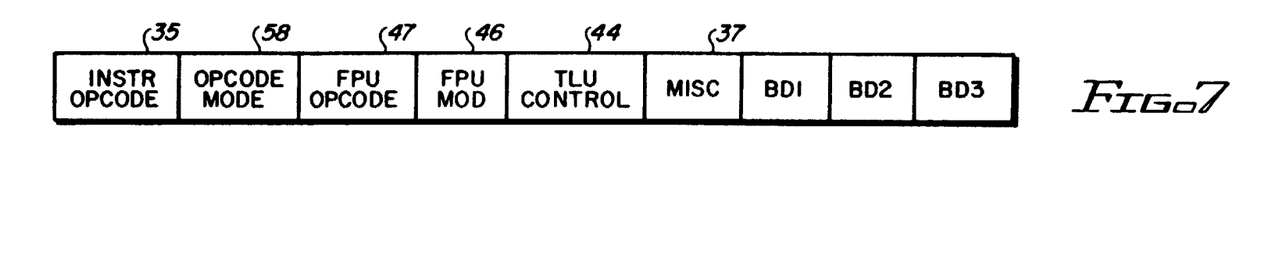
FIG. 7 is a simplified illustration of an instruction format usable in the FIG. 1 illustrated apparatus.

Following the instruction fetch, addresses contained in the instruction are computed. Each instruction contains three addresses, BD1, BD2 and BD3 (FIG. 7). These addresses are used respectively as source 1, source 2 and destination addresses. The source 1 and source 2 addresses are used to fetch two words from data store 12 that will be operated on by the FPU 30. For non-branch instructions, the destination address specifies the location in data store 12 that the FPU 30 calculated result is to be stored. For branch instructions, the destination address is the branch target address.

The address fields are known base-displacement (DB). The field identifies the base register (not shown) containing a base address, a displacement from the base address, whether the addressing is indirect or in an index mode. This arrangement provides four addressing modes, a true base plus displacement, base plus index, base plus displacement indirect, and base plus indexed indirect. Each of the three addresses in an instruction has its own addressing mode. If more than one of the addresses specifies an indirect address, then the indirect address is selected using the priority of source 1 first, source 2 second, and then destination address. The selected indirect address is then applied to all addresses specifying indirection in that one instruction. Pointers in data store 12 may also be used by host 10 which does byte addressing.

Global Program Counter Update

Next, global program system 20, which includes global program counter 34 (FIG. 4) is updated as necessary. Such updating occurs only in the pipeline mode, in either the vector or parallel modes global program counter 34 is not updated. Such operation mode is reflected in the instruction opcode 35 of the FIG. 7 illustrated instruction, as later described. If the pipeline has six pipeline stages 71-76, operating in the pipeline mode, then the instruction address for the successive instructions for the respective pipeline stages are displaced by six.

Data Fetch

This operation is represented in FIG. 2 in box 2. Any of the above-described addressing modes can be used. The MISC field 37 contains immediate bits for the BD1 field in the instruction word of FIG. 7. When the source 1 immediate bit is set to an active condition, then the source 1 data, rather than being accessed from data store 12, is the source 1 address BD1. If the immediate bit is not set, then the source 1 data is fetched from data store 12 at the source 1 indicated address. The source 2 data is fetched from the data store 12.

Address Register 40 Load

Address registers 40 (FIG. 3) supply data addresses to data store 12 and branch addresses to the designated program counter 34 or 71-76 all through later-described switching logic 51. The address registers 40 are addressable using known addressing techniques. The address of the address registers 40 specified in the MISC field 37 will be loaded from the data specified in the load source portion of field 37. The following sources may be specified as the address register load source: no address register will be loaded, the address register will be loaded with a pointer from the data word fetched at the address contained in BD2, the address register will be loaded with an integer from the data word fetched at the address contained in BD2, the address register will be loaded with the contents of BD2 (source 2 address), the address register will be loaded with the contents of the stage program counter 71-76 (FIG. 4) associated with the instruction plus unity (loads the address for the next instruction word to be fetched for the pipeline stage), or the address register will be loaded with the contents of the global index register 21.

Table Lookup

Processors 17 include table lookup unit (TLU) 41 which can be used to accelerate execution of table based algorithms, such as divide, square root, logarithm, exponential and the like. TLU 41 may also include general tables, such as those used in program models of an entity or device to be simulated or analyzed. The table lookup operates on the source 1 data, and to provide a table looked-up value to FPU 30 over bus 42 in place of the BD1 specified source 1 data. The tables can be in a ROM form, down loaded from host 10 into a RAM, loaded from a diskette into a RAM, and the like. To support a variety of table solvable algorithms the TLU control field 44 (FIG. 7) not only indicates which table of several to be used but also operational parameters beyond the present description. This operation is represented in FIG. 2 by box 3 FPU load and table lookup. As one example, a table can be used for extracting the exponent from a floating point number and a second table can be concurrently used for extracting the mantissa of such floating point number, both values to be operated upon by FPU 30 in execution of the current instruction.

FPU 30 Calculation

The source 1 (or its TLU derivative) and source 2 data words are loaded into FPU 30, one to a multiplier portion (not shown) and one to an arithmetic-logic unit (ALU) (not shown). Provisions are made for swapping the FPU internal destinations of the two data words, such as may be provided field FPU modifier (mod) field 46 associated with the FPU opcode field 47 of the FIG. 7 illustrated instruction word. Both data words are computed upon as a function of the FPU opcode field 47 contents. FPU 30 operations are represented in FIG. 2 by boxes 4, 5 and 6.

Program Counter Update

The stage program counter is updated to the address of the next instruction to be executed by this pipeline stage. The source of this update is a function of the instruction opcode field 35, as will become apparent.

FPU 30 Result Storing

If the instruction opcode is one of the later-described calculate types, then a result has been calculated by FPU 30 that may be stored in data store 12 at the destination address. Before the FPU result is stored, if the flip destination bit (not shown) in the FPU mod field 46 is set, then the high order half of the calculated result and the low order half of the calculated result are swapped before storage. The storage of the FPU result is done under the control of the FPU mod field 46 as follows: The result is not stored, only the high order half of the FPU result is stored, only the low order half of the FPU result is stored, or the entire FPU result is stored. This storage activity is represented in FIG. 2 by box 7, data store.

Access to address registers 40 is under control of multiplexor MUX 50 in a known manner for achieving the results set forth above. MUX 50 passes the address for selecting which of the address registers is to be accessed. The instruction data from instruction store 26 is loaded into the address register 40 indicated by the register address supplied through MUX 50. Logic 51 includes adding units respectively for the source 1, source 2 and destination addresses, such as for adding base and displacement values, etc, as received from the address registers 40 and instruction store 26. Controls 52 include the usual instruction decoder, instruction execution sequencing circuits, and circuits known in the art which supply control signals for effecting machine operations which execute decoded instructions. The internal construction of such controls are well known, implementation of instruction execution sequences are discernible from descriptions of such instructions; accordingly a detailed showing of these controls is dispensed with for avoiding obfuscating the description of the invention. The arrows 52A and 52B indicate instruction word connections 29 to instruction store 26. Output connections also go to logic 51 and other units of pipeline apparatus, as is known. The modified addresses supplied from logic 51 pass through multiplexor 53 to data store 12, to MUX 50 for selecting another address register or to pipeline program system 14 (destination address) for a branch operation, all in accordance with instruction decoding in control 52 (control connections not shown). Address information from MUX 53 also travels over bus 54 to select a table in TLU 41 using MUX 55 to switch the table selection input as indicated by the opcode mod field 58 (FIG. 7) to effect the functions described above for the TLU 41. Such signals also travel to FPU 30. Additionally, FPU 30 receives data words to be operands over bus 60 from data store 12. Bus 61 carries data from data store 12 to FPU 30 and to MUX 50 for loading address register 40. Global index register 21 receives vector control data from logic 51 and supplies its stored data to load one of the address registers 40 via MUX 50. Global program system 20 receives branch and other control information over bus 65 from instruction store 26 or address registers 40 via logic 51. Global program system 20 manages the pipeline program system 14 by supplying address and control information over bus 67, all as will become apparent. Status register 90 is addressable by host 10 as indicated by the lines 91 for respectively writing into status register (including resetting after reading predetermined status bits) and for reading the contents thereof. The contents of status register 90 includes error information relating to pipeline apparatus 11, such as instruction decoding errors set into the status register by control 52, other error information from other components shown in this application, branch status, host signal pending bit (signifying to host 10 that information or calculation results are available in data store 12, etc), host interrupt pending bit which indicates to control 52 that pipeline apparatus 11 has signalled host 10 to read from the communication area (not separately shown herein) of data store 12 for obtaining operations to be performed for host 10, etc, status of FPU 30 operations including calculation error indications, global flag bit (later described) and the like. The contents of status register 90 enable communications between host 10 and pipeline apparatus 11 as well as containing program status information useful in the different modes of operation of pipeline apparatus 11, as will become apparent.

Before describing more electronic apparatus used in the illustrated embodiment, the instruction types and their respective operations are described. The instruction opcode (operation code) in field 35 (FIG. 7), as modified by the opcode modifier (mod) field 58 contents, controls how the later described program counters are updated, whether a FPU result will be stored, and the loading of certain global facilities found in global program system 20. By controlling the program counter updating, the opcode determines whether the pipeline stage executing the instruction is operating in parallel mode or in pipeline mode. The vector mode is determined by global index register 21 having a value greater than 1 and the respective pipeline stage obtaining its next instruction address from global program counter 34, as will become more apparent. A parallel mode opcode typically increments the respective stage program counter 71-76 by one causing the pipeline stage to execute the next instruction in its parallel subprogram without affecting what the other pipeline stages are doing. A pipeline mode opcode typically enables incrementing global program counter 34 in the first pipeline operation (box 2 of FIG. 2) and then loads the processor counter 15 to one of the stage program counters 71 through 76 from global program counter 34 in the last pipeline operation corresponding to box 7, "data store", of FIG. 2. If all six pipeline stages are executing pipeline mode instructions, then global program counter 34 is incremented by each of the six pipeline stages before global program counter 34 supplies the instruction address to designated one of the stage program counters 71-76. So if the first pipeline stage executes an instruction in the pipeline mode at address XY, then its stage program counter will be loaded with XY+6. In this fashion the first pipeline stage executes the instruction at address XY, the second pipeline stage executes an instruction stored at address XY+1, the third pipeline stage executes an instruction stored at address XY+2 and so on. This global program counter controlled sequencing continues until later described branch-to-parallel mode instructions are encountered in the stream of instructions currently being executed in the pipeline mode.

The below-described instruction opcodes illustrate the practice of the present invention in the illustrated embodiment. In the description below, the term program counter refers to the stage program counter 71-76 of the pipeline stage executing the instruction. The mode of instruction is indicated by the first word, i.e. parallel or pipeline. Parallel instructions are described first; for the most part, parallel instructions have pipeline counterpart instructions.

Parallel Calculate

This instruction effects calculations within a parallel subprogram. The following operations are performed: address calculation (box 1 of FIG. 2), data fetch (box 2 of FIG. 2), address register load, table lookup (box 3 of FIG. 2), FPU calculation and FPU result store are done as described (boxes 4,5 and 6 of FIG. 2). The program counter is incremented by one. The global program counter 34 is not updated (not in pipeline mode).

Parallel Calculate Serialized

This instruction is the same as the parallel calculate instruction except that it is serialized. Serialization means that any resource, such as a storage location in data store 12, is dedicated to the instruction execution and is not available to any requestor until after the completion of this instruction execution. This action prevents any calculate operation from starting until any other pipeline stages with outstanding serial operations using the same Source 1 Address have completed. Thus a calculation reflects any updates to the source 1 data that were in progress when the instruction was encountered. This instruction is used to allow several parallel subprograms to update the same location when the order of updates is not important. Once an instruction has been serialized, all other pipeline stages are prevented from starting a serial operation using that Source 1 address until the entire sequence has been executed.

Parallel Calculate and Return

This instruction is the same as Parallel Calculate except that rather than incrementing the stage program counter at the end of the instruction execution, this action causes the pipeline stage to return from a parallel subprogram to pipeline mode operations.

Parallel Calculate and Return Serialized

This instruction is the same as the parallel calculate and return instruction except that it is serialized in the same manner as parallel calculate is serialized. As set forth above, all of the parallel mode instructions having the return feature enable the executing stage processor to return from executing a parallel mode subprogram to pipeline mode operations.

Parallel Branch

This instruction is used to perform a conditional branch within a parallel subprogram. The branch is conditional on the results of the FPU calculation performed by THIS instruction, it can be thought of as a compare and branch instruction. The FPU opcode in field 46 (FIG. 7) should be a floating point compare for floating point data and a integer subtract for integer data. The following operations are performed: address calculation, data fetch, address register load, table lookup, and FPU calculation. The FPU result is not stored but the FPU condition code is used with a condition set forth in the FPU mod field 46 to determine if the branch is to be taken. One of the following conditions are used to effect a branch: branch if less than, branch if less than or equal, branch if equal, branch if greater than or equal, branch if greater than, branch if not equal, unconditional branch, or never branch (no-op). If the branch is taken, the respective stage program counter 71-76 (FIG. 4) is loaded with the destination address; not taking the branch increments the respective stage program counter 71-76 by one. The global program counter 34 is not updated in this parallel mode instruction execution.

Parallel Branch Serialized

This instruction is the same as the parallel branch instruction except that the serialization is in effect. This serialization control prevents the branch operation from starting until any other processors with outstanding serial operations to the same source 1 address have completed. Thus a compare done within this branch instruction will reflect any updates to the source 1 data that were in progress when the branch was encountered.

Parallel Set Global Flag

This instruction is used to set the later-described global flag bit in status register 90 (FIGS. 3 and 4) from within a parallel subprogram. This instruction effects transfer of program control information from a parallel subprogram to a pipeline program. The following operations are performed: address calculation, data fetch, address register load, table lookup, FPU calculation, and take branch calculation are the same as for parallel branch above. If the take branch calculation indicated a branch then the global flag register is set. Otherwise the global flag bit of status register 90 is not changed. The respective stage program counter 71-76 is incremented by one. The global program counter is not updated (parallel mode instruction). The global flag bit of status register 90 can be later sensed by a program executing in the pipeline mode.

The instructions described below are pipeline mode instructions.

Pipeline Calculate

This instruction is used to perform a calculation within a pipeline mode program. The following operations are performed: address calculation, data fetch, address register load, table lookup, FPU calculation and FPU result store are done as described above. The global program counter 34 is incremented by one. The respective stage program counter 71-76 is loaded with the current instruction address in the global program counter 34.

Pipeline Calculate and Load Global Index Register

This instruction is used to perform a calculation within a pipeline mode program and to load the global index register 21 in preparation for a vector operation. A vector operation is performed by repeating the instruction at the next instruction address which is stored in global program counter 34. Any number of pipeline stages can execute such instruction during its respective time slice, each pipeline stage repeatedly obtains instruction addresses from the global program counter 34. Pipeline stages operating in the parallel mode still obtain their respective instructions through incrementing the respective stage program counters 71-76; upon completion of the parallel program, a given pipeline stage obtains its next instruction from global program counter to participate in the vector calculation until it is completed as indicated by the index register being down counted by the execution of each instruction in the vector mode until unity. The following operations are performed by this instruction execution in preparation for the upcoming vector calculation: address calculation is done as described above. The global index register is loaded with the value of the Source 1 address before indirection, if any is specified, is performed. The global index register is loaded immediately after address calculation (as in box 2 of FIG. 2) and its value may be loaded into an address register 40 in the same instruction. Data fetch, address register load, table lookup, FPU calculation and FPU result store are done as described above. The global program counter 34 is incremented by one. The respective stage program counter 71-76 is loaded with the current contents of global program counter 34.

Whenever a value greater than zero is loaded into the global index register, incrementing of the global program counter 34 is inhibited starting with the next instruction. The global index register content is decremented by one each time a pipeline mode instruction is executed. This control action continues until the global index register 21 contents have been decremented to zero. This action causes the next instruction to be executed a given number of times as indicated in the global index register 21 for effecting pipeline mode established program control for use in a vector mode calculation involving a variable number up to six of the pipeline stages. Only the following instructions are valid for the next instruction to be repeatedly performed to effect a vector calculation: Pipeline Calculate, Pipeline Branch or Pipeline Set Global Flag. The contents of the global index register 21 can be loaded into an address register 40 so that it can be used to index vector data.

Pipeline Branch

This instruction is used to branch the pipeline stage executing it from pipeline mode to a parallel mode subprogram to be next executed by such executing pipeline stage. Note that the pipeline branch can be executed in the vector mode for causing a predetermined number of the pipeline stages to execute a series of subprograms, either for vector operations or for executing a series of parallel subprograms. In executing this instruction, the following operations are performed: address calculation, data fetch, address register load, table lookup, FPU calculation, and take branch calculation proceed the same as for Parallel Branch above. The global program counter 34 is incremented by one. The respective stage program counter 71-76 updating proceeds the same as parallel branch described above.

Pipeline Branch Global

This instruction is used to perform a conditional branch within a pipeline mode program. The branch is done by altering the address contents of the global program counter 34 so that the next processor counter 15 indicated pipeline stage executes the branch target instruction. Since the global program counter 34 must be updated in the first pipeline stage, the global flag bit in status register 90 is used to determine the branch decision rather than the later available FPU calculated result, which is usable as a branch condition code in other branch operations. The following operations are performed in the instruction execution: address calculation, data fetch, address register load, table lookup, and FPU calculation are done as described above. The FPU result is not stored. The global program counter is updated according to the instruction conditions as set forth in the opcode mod field 58 field as follows: (1) "if set"; If the Global Flag Register is set then the global program counter 34 is loaded with the destination address before address indirection. Otherwise the global program counter is incremented by one (2) "if not set"; If the global flag bit in status register 90 is not set, then the global program counter 34 is loaded with the destination address before address indirection. Otherwise the global program counter is incremented by one. (3) "unconditional action"; The global program counter 34 is loaded with the destination address before address indirection. (4) "end action"; The global program counter 34 is incremented by one. The global flag bit in status register 90 is reset. The respective stage program counter 71-76 is loaded with the contents of the global program counter 34. Since the FPU result can not be stored, the branch is conditioned by the global flag bit in status register 90 rather than using the FPU 30 calculated condition code. In executing this instruction, no useful function is performed by FPU 30.

Pipeline Set Global Flag

This instruction is used to set the global flag bit in status register 90 from within a pipeline mode program. The following operations are performed: address calculation, data fetch, address register load, table lookup, and FPU calculation and flag setting proceed the same as for parallel set global flag instruction described above. The global program counter 34 is incremented by one. The respective stage program counter 71-76 indicated by processor counter 15 is loaded with the instruction address contents of the global program counter 34.

Pipeline Wait

This instruction causes the global program system 20 to wait for all executing parallel subprograms to complete. In this wait mode, no pipeline instructions (including vector operations using the instruction address stored in global program counter 34) are executed. For executing this instruction, the following operations are performed: address calculation, data fetch, address register load, table lookup, and FPU calculation are done as described above. The FPU 30 result is not stored. The global program counter 34 is incremented by one after each of the other five pipeline stages completes an instruction that will cause it to load its respective stage program counter 71-76 with the contents of the global program counter 34. For example, if the other pipeline stages are executing parallel subprograms, then the global program counter 34 is not again incremented until all of the subprograms have completed. Any pipeline stages executing in the pipeline mode start waiting upon completion of the current cycle of execution of the pipeline operation, i.e. complete execution of one instruction. When the global program counter 34 is not being incremented, the pipeline wait instruction is executed repeatedly by the processors that have completed their subprograms. When executions of all the subprograms have completed, the global program counter 34 is again incremented and pipeline mode execution resumes at the next pipeline instruction to be executed following the described wait operation. The respective stage program counter 71-76 is loaded with the instruction address contents of global program counter 34. Since the FPU 30 calculated result is not stored and the FPU condition code is not used, no useful function is performed by the FPU.

Pipeline Signal Host

This instruction is used to set the host signal bit in the pipeline status register 90, a separate hardware register. The following operations are performed: address calculation, data fetch, address register load, table lookup, and FPU calculation are done as described above. The FPU result is not stored. The host signal bit in the pipeline status register 90 is set. The global program counter 34 is incremented by one. The respective stage program counter 71-76 is loaded with the contents of the global program counter 34. Since the FPU result is not stored and the FPU condition code is not used, no useful function is performed by the FPU 30.

Signalling host 10 is initiated by this instruction through setting a "host signal pending" bit of status register 90. Host 10 is programmed to appropriately time the sensing of status register 90 for the host signal pending bit or it can be achieved through known electrical circuits which respond to the host signal pending bit, such as in a known response to an interruption signal.

The construction of the global program system 20 and the pipeline program system 14 is next described with particular reference to FIG. 4. The sequencing of operations of both program systems 14 and 20 is effected by control 52. In the global program system 20, a multiplexor 100 determines the input to the global program counter 34, both as to branch input addresses and instruction address incrementation. The decoded instruction opcode is received over bus 99 from field 35 of the instruction to be executed controls multiplexor 100 to either receive the increment signal on line 101, the branch address received over cable 65 or to receive neither of the above-such as when all stages in the pipeline are executing in the parallel mode. When the instruction opcode is any of the pipeline instructions, then the line 101 increment signal is passed to the global program counter 34.

Figure 5:
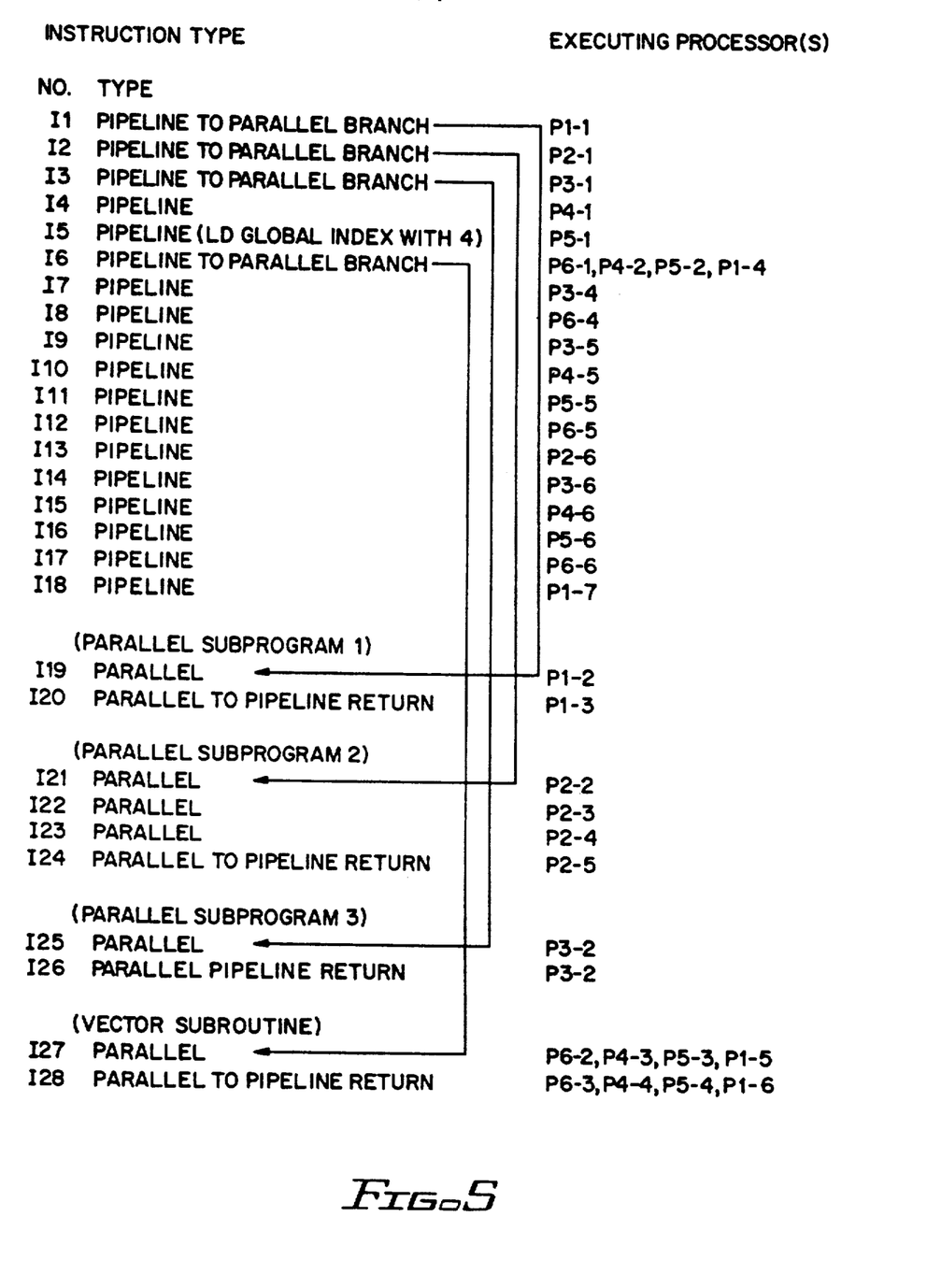
FIG. 5 is a simplified execution illustration chart on control and mixing of pipeline, vector and parallel operations or mode in the FIG. 1 illustrated apparatus while using the FIG. 4 illustrated program control means.
Figure 6:
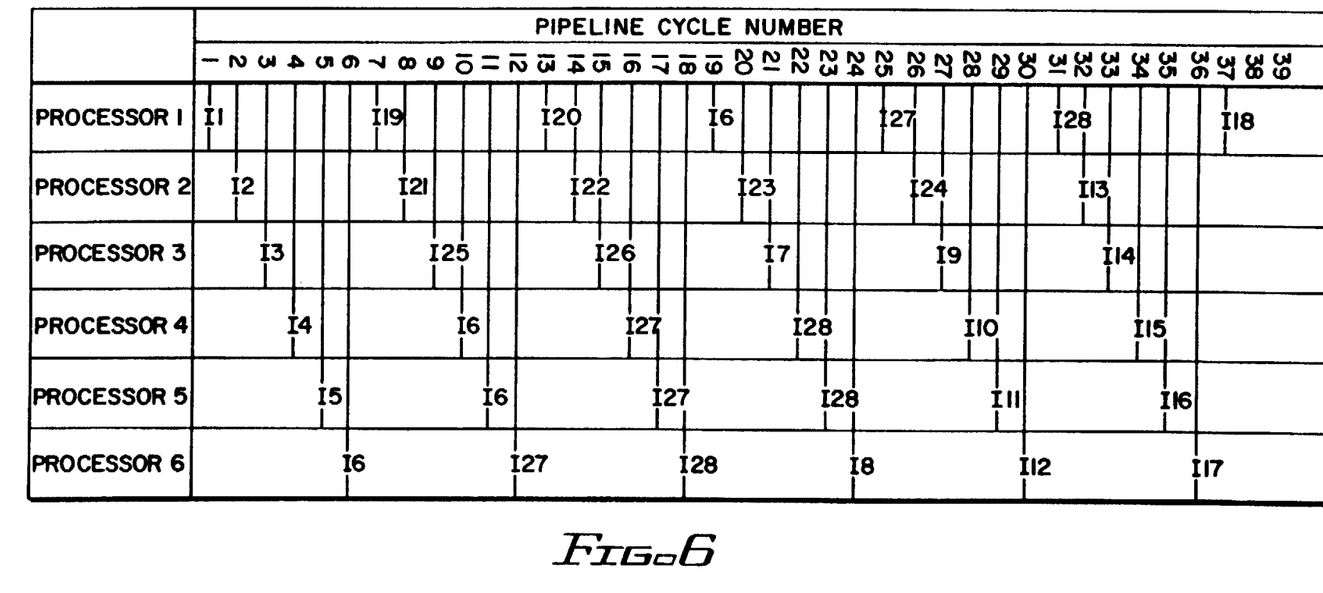
FIG. 6 illustrates the cycle timing for the FIG. 5 operation illustration.

FIG. 5 diagrammatically shows the various pipeline stages in different modes of operation. Initially, all six of the pipeline stages P1 through P6, also respectively represented by the program counters 71 through 76 in FIG. 4, are in the pipeline mode. The "No." column having numbers I1 through I28 are merely reference numbers used to relate the timing diagram of FIG. 6 to FIG. 5. The first instruction at reference line I1 is a pipeline mode to parallel mode branch executed by pipeline stage P1 in the pipeline mode. The notation P1-1 indicates stage processor P1 is executing its instruction number 1. FIG. 6 shows this instruction execution as occurring in pipeline cycle number 1 as I1. P1's second instruction, shown in FIG. 5 at line I19, is executed in pipeline cycle 7 (FIG. 6). P1's third instruction execution is at line I20 of FIG. 5 occurring in pipeline cycle 13 of FIG. 6 (during the third iteration of the pipeline controlling processor counter 15). Lines I19 and I20 of FIG. 5 represent P1 executing a parallel subprogram while later described other ones of the stage processors are executing in the pipeline mode or executing a vector subroutine. P1's fourth instruction execution is found in FIG. 5 at line I6 in a pipeline to parallel branch for causing P1 and other stage processors P4, P5 and P6 to perform one vector operation, each of the stage processors operating on different elements of the four element vector being processed. For P1, the FIG. 5 line I6 branch occurs at pipeline cycle number 19 of FIG. 6. Note that the cycle numbers in FIG. 6 are associable with the instruction reference numbers of FIG. 5 by locating the letter "I" (1 means instruction reference) immediately below the cycle numbers. The lower row of cycle numbers are the units digits and the upper row of numbers are the tens digits. P1's 5th and 6th instructions are located in lines I27 and I28 of FIG. 5 which show the vector operation by the four stage processors P1, P4, P5 and P6. P1's instruction execution in the vector mode is shown in FIG. 6 as occurring at pipeline cycle numbers 25 and 32. P1's last instruction execution P1-7 is found in line 118 of FIG. 5 as a pipeline mode instruction. The sequence of operations in different modes for all of the stage processors P2 through P6 can be followed in a similar manner. Also, the parallel and vector programs are shown as containing only two instructions only for the purposes of illustrating the operation of the present invention, in a practical program, the parallel mode operations and the vector operations could employ hundreds or more instructions in each excursion of the respective stage processor from the pipeline mode to the parallel mode.

The table below also shows the timing relationships and concurrent operations of the stage processors P1 through P6 in different modes. In this table the pipeline cycle number lists the lowest and highest numbered cycle in the respective pipeline iterations, i.e. number 01-06 indicates cycles 1-6 in the first pipeline iteration, etc. The abbreviations PI indicate pipeline mode execution, PB pipeline mode to parallel mode branch, PA parallel mode execution, PJ parallel mode to pipeline mode branch, VE means vector mode operation using a parallel type instruction and the index register 21 and VB means vector mode (which repeatedly executes one pipeline instructions simultaneously in a variable number of pipeline stages at indexed data addresses) to pipeline mode as the index register counts down to one.

TABLE 1

| CY-CLE | 01-06 | 07-12 | 13-18 | 19-24 | 25-30 | 31-36 |
|---|---|---|---|---|---|---|
| P1 | PB | PA | PJ | PB/VB | VE | PJ/VE |
| P2 | PB | PA | PA | PA | PJ | PI |
| P3 | PB | PA | PJ | PI | PI | PI |
| P4 | PI | PB/VB | VE | PJ/VE | PI | PI |
| P5 | PI | PB/VB | VE | PJ/VE | PI | PI |
| P6 | PB/VB | VE | PJ/VE | PI | PI | PI | processors in the pipeline mode, the second iteration 07-12 finds P1 through P3 in the parallel mode, P4 and P5 in the pipeline mode and P6 in the vector mode. Examination of Table 1 shows the dynamic changing of modes among the stage processors P1 through P6 which in effect provides load balancing for efficient total processing using any of the three described modes of operation. The following discussion describes some aspects in employing the present invention in performing some program operations.

To load data into and store the contents of one of the address registers 40, any of the instructions described above may load an address register simply by specifying a load source and an address register 40 number (address of the address register) to load. There are various different ways a program could load address registers 40. These include: load an address register from immediate data in the instruction, load an address register from another register, perform arithmetic on the contents of an address register, or load an address register with data from the data store 12.

Most of these operations use the source 2 address as the load source. Data can be loaded from another address register by specifying the source 2 addressing mode to be base plus displacement, specifying the other register as the source 2 base register, and specifying the source 2 displacement to be zero. Similarly address register incrementing can be done by specifying a non-zero displacement and decrementing by specifying the displacement in two's complement notation. More complex address register arithmetic includes storing the address register contents to data store 12 and operating on it with the FPU and then loading the FPU result into the address register from data store 12. An immediate value can be loaded by specifying the value as the displacement and using an address register containing zero (0) as the base register. It is generally a good idea for one of the global address registers 40 to contain a zero (0).

Storing the contents of an address register can be done by specifying: instruction opcode=any calculate type; source 1 addressing mode=base plus displacement; source 1 base register =register to store source 1 displacement=0; source 1 Immediate=1; table type=-None; FPU function=Pass source 1. Both an address register load and an address register store can occur in the same instruction. This function can be useful for swapping address register data.

Parallel mode programming has one or more of the stage processors P1 through P6 executing an independent subprogram. Any of the parallel mode instructions may be used. Each subprogram should end with a "Parallel Calculate and Return" or a "Parallel Calculate and Return Serialized" instruction. An optimization available is to combine loading an address register with a calculation in the same instruction.

The pipeline apparatus 11 uses shared data store 12 for all concurrently running parallel subprograms. These parallel running subprograms can access shared read-only data with no constraints. Synchronization between the parallel subprogram execution is required to control updating shared writable data. In some numerical processing, the update to the shared data is of a serial kind. That is each subprogram needs to perform a simple operation on the data and the order these operations occur in is not significant. Since many numeric applications need only this type of synchronization, the pipeline apparatus 11 provides a highly efficient means of doing it. All the application needs to do is to use the serialized version of a calculate instruction and specify the location to be updated both as the destination and the source 1 address. Any FPU 30 operation can be used. In the usual case where no two subprograms are trying to update the same location at the same time there is no performance penalty for using the serialized versus the non serialized calculate instruction. Thus most of the needed synchronization can be achieved with no programming overhead. For other applications, where ordering of global updates is important or when the update itself is quite complex, usual multiprogramming locking can be used, such as with a compare and swap operation. A usual compare and swap operation compares the contents of a lock location against a specified compare value. If they are equal the lock is updated to a specified new lock value otherwise the new lock value is set to the existing contents of the lock location. A compare and swap operation can be implemented by the instructions (1) "Parallel Branch Serialized"; The address of the lock data is specified as the source 1 address. The address of the compare data is specified as the source 2 address. The FPU opcode is compare branch address should be instruction 4 and the Condition should branch if they are equal. (2) "Parallel Calculate Serialized"; This instruction is executed if the compare in instruction (1) was not equal and it should move the current lock data (specified as the source 1 address) to a new lock data location (3) The "parallel branch"

branches the subprogram around instruction (4). (4) The parallel calculate serialized instruction is executed if the compare in instruction (1) above was equal. It should move the new lock data (specified as the source 2 address) to the lock data location (specified as both the source 1 and the destination addresses). A swap source 1 and source 2 bits (not shown) are set to move the data from the source 2 address. This operation takes advantage of the fact that contiguous serialized instructions with the same source 1 address prevent all other pipeline stages from obtaining serial access to the source 1 Data while the instruction sequence is in progress. In this case, it prevents another pipeline stage from doing a compare once the instant compare has occurred and before the instructions have updated the lock data.

Writing a program in pipeline mode applies all of the pipeline stages to a single instruction stream. Any of the pipeline mode instructions may be used. If none of the processors are executing parallel subprograms then the same processor will execute every sixth instruction. There is a classic problem with pipelines when an instruction requires the result of a previous instruction that has not completely progressed all of the way through pipeline. Many machines have electronic circuits to detect this condition and to delay the execution of the instruction needing the data until it is available. When pipelined apparatus 11 does not detect this condition, it is then the program's responsibility to assure that the instructions are scheduled (or spaced with no operation instructions) so the data they use will be available.

In branching, the "pipeline branch global" rather than the "pipeline branch" instruction is used for branches in a pipeline mode program. The pipeline branch instruction only branches one stage processor's program counter whereas the pipeline branch global instruction branches the global program counter 34 which causes all of the stage processors P1 through P6 to follow the branch. Since instructions from the pipeline mode program are started every pipeline cycle, the branch decision should occur in the first pipeline stage processor P1 so that the global program counter 34 can be updated in time for the next stage processor to execute the correct instruction. However the FPU condition code is not available until the sixth pipeline stage, so unlike the parallel branch instruction, the pipeline branch global instruction is conditional on the global flag bit in status register 90 rather than the FPU 30 generated results. To program the equivalent of the compare and branch capability of the parallel branch instruction the following pipeline mode instructions can be used: (1) pipeline set global flag: Do the compare and set the global flag if branch should be taken. (2) Five successive unrelated or "no-op" (no operation) instructions are required to adhere to the pipeline constraints described above. (3) pipeline branch global: Branch if global flag bit of status register 90 is set to an active condition. An unconditional branch can be effected as with the branch global instruction.

To invoke parallel subprograms from the pipeline mode, a pipelined programmed application may use many parallel subprograms (or instances of the same program with different data) that can be concurrently executed. Since each subprogram can use data dependent branches, it is not known until program execution how long each subprogram will take to execute. The pipelined apparatus 11 needs to dynamically assign each of the parallel mode subprograms to one of the stage processors so that the work will be evenly distributed amongst the stage processors. This dynamic assignment is effected through global program counter 34. The executing pipeline program uses a sequence of pipeline branch instructions. Each of these pipeline branch instructions initiates a different parallel subprogram to execute. The branch address specifies the parallel subprogram to be executed (several pipeline branch instructions may specify the same parallel subprogram). The pipeline branch instruction may also load an address register 40 with a parameter unique to that activation of the parallel subprogram. When the first pipeline branch instruction is executed, the first stage processor P1 through P6 which is in the pipeline mode branches to and begins to execute the first subprogram. The global program counter is incremented so that the next stage processor P1 through P6 in the pipeline mode encounters the next ensuing pipeline branch instruction. This last-mentioned next stage processor then begins execution of the second subprogram in the next ensuing pipeline iteration. This execution of plural parallel subprogram continues until all six stage processors P1 through P6 are concurrently executing the first six parallel subprograms. At this point the global program counter 34 contains an instruction address pointing to the seventh branch instruction. Global program counter 34 holds this seventh branch instruction address until a one of the stage processors P1 through P6 completes its respective subprogram and returns its mode of operation to the pipeline mode (encounters a parallel return instruction, such as a calculate and return instruction). Remember that when all pipeline stages are executing in the parallel mode, the global program counter 34 is not incremented. With the one pipeline stage now being in the pipeline mode, global program counter 34 supplies the instruction address for the seventh branch for activating the one stage processor to execute the seventh parallel subprogram. The global program counter 34 is again incremented to contain the instruction address of the next ensuing pipeline program instruction. In this manner each subprogram is assigned to the first one of the stage processors P1 through P6 to become free (i.e. return to the pipeline mode indicating that the parallel subprogram it was executing has been finished) until the entire list of parallel subprograms is exhausted. At this point, as each stage processor completes its final subprogram it returns to the pipeline program following the branch list for activating a plurality of parallel subprograms.

If all of the parallel subprograms must complete before the application can proceed, then the branch instruction sequence can be followed by a Pipeline Wait instruction. In this case some pipeline stages may be idle while the remaining pipeline stages are completing their respective subprograms. To reduce the effect of this idling pipeline stages, position the longer running parallel subprograms at the top of the parallel subprogram pipeline-branch list. The longer the list of pipeline branches to the parallel mode, the more efficient the multiple parallel subprogram operation becomes. In performing vector operations, using the global index register 21 efficiently distributes the vector operations on each vector element (which are assumed to be independent) among the six pipeline stages P1 through P6. This kind of vector operation control is effected from within a pipeline mode program. If an application requires a vector operation within a parallel subprogram, it should be done by coding a usual program loop using a parallel branch instruction.

There are two types of vector operations. The first type is a subroutine vector operation where more than one instruction is required to operate on each element of a vector. Examples of this type are a vector Sine operation or calculations checking the convergence of a vector. The second type is an inline vector operation where only one instruction is used to operate on each element of a vector. An example of this type is adding two vectors.

The subroutine vector operation is described first. Subroutine vector operations are done quite like the parallel subprogram pipeline branch list except that a single pipeline branch instruction is executed repeatedly by using the global index register 21 to inhibit incrementing of the global program counter 34. The repeated executions of the instruction identified by the instruction address held in global program counter 34 can effect repeated incrementing of the source 1, source 2 and destination addresses to effect the vector calculation. Each execution of the pipeline branch instruction causes a parallel subprogram to be run that computes the vector operation for a single element of the vector. The global index register 21 is also used to provide the index identifying which element of the vector is to computed by each instance of the subprogram execution. Coding a subroutine vector operation requires two pipeline mode instructions plus the parallel subprogram or subroutine to operate on each element of the vector. The first pipeline mode instruction is a pipeline calculate and load global index register 21 instruction. The index register 21 is loaded with the vector length. This instruction may also be used to do some other calculations. The second pipeline mode instruction is a pipeline branch instruction. The branch address is set to the address of the parallel subprogram or subroutine which operates on the vector elements. This second pipeline instruction should also be setup to load one of the address registers 40 with the contents of the global index register 21. The activated parallel subprogram or subroutine is programmed as a usual parallel subprogram using the address register 40 loaded by the pipeline branch instruction to index into the vector. The vector base address would be typically in a address register 40 which is loaded before the start of the vector operation. The parallel subprogram can use any parallel mode instructions including conditional branches such that the time required to compute each vector element may not be the same. This is no problem as the next vector element to be calculated is assigned to the next stage processor which is in the pipeline mode regardless of the order that the stage processors P1 through P6 become available by returning to the pipeline mode after completing their respective parallel mode subprograms. If it is critical to the application that all elements of the vector operation be computed before the next ensuing pipeline instruction following the vector calculations is executed, then the vector operation should be followed by a pipeline wait instruction.

In inline vector operations, the global program counter 34 is inhibited from incrementing by the global index register 21. Rather than code a branch instruction to be executed repeatedly, a pipeline calculate instruction performs the vector operation for a single element. As in the subroutine vector operation this Pipeline Calculate instruction also loads an address register 40 with the current contents of the global index register 21 so that it can be used to index the vector data. Since this address register 40 load does not take place immediately, the vector calculation is treated as a pipeline. That is, a particular instance of the pipeline calculate instruction is loading the address register 40 for the instance that will be executed two vector elements later. Hence the address register 40 loading pipeline calculate instruction and the "using" pipeline calculate are executed two different pipeline stages P1 through P6 so an address register 40 suitable for global or pipelined operations stores the index value. When the vector-calculating pipeline operation stops, last two index values (2 and 1) will have been loaded but not calculated on whereas when starting the first two calculate instructions the index value is not loaded. To solve this problem, simply load those two values into the address register 40 in the two instructions before the calculate. Thus to program an inline vector operation, the following three pipeline instructions may be used: (1) pipeline calculate (load an address register 40; (2) pipeline calculate and load global index register with vector length (load an address register 40); (3) pipeline calculate vector element operation (load the address register 40 with the contents of the global index register 21). This code requires a vector length of at least two. If necessary, an application can test for a vector length of one and specially handle it.

Subroutine calls other than pipeline to parallel are facilitated by the ability to load an address register 40 with the address contents of a stage program counter 71-76 plus one. The subroutine uses this return address by specifying a branch (or a branch global for pipeline mode) at the end of the subroutine using base plus displacement addressing mode for the destination address.

Another use of the global flag bit of status register 90 besides the pipeline mode compare and branch operations is in computing a condition that is the composite of a series of concurrent calculations. An example of this situation is checking Newton convergence of a vector solution. Each element of the vector is checked for convergence and if any of the elements does not converge then the Newton algorithm has not converged. To program this checking, the check of a vector element is written as a parallel subprogram which could be invoked using the above-described vector or subprogram branch listings. The subprogram indicates that an element had not converged by setting the global flag bit of status register 90 (using a parallel set global flag instruction). If the global flag bit of status register 90 is set after all of the subprograms checking vector convergence have completed, then the Newton algorithm has not converged. A pipeline branch global instruction branches from a pipeline program to handle non-convergence of the calculations. Note that the branch global instruction resets the global flag bit of status register 90 so that a new test can be done after each pipeline branch test, i.e. like test and reset operations.

Since in the illustrated embodiment, pipeline mode instructions are required to invoke parallel subprograms, every program will include at least one pipeline mode top level routine. Normally to start a program the host 10 down loads the pipeline apparatus 11 instructions, sets the global program counter to point to the first instruction, and starts the pipeline apparatus 11. The application does not require any special code at the beginning of the initial pipeline program. At the end of the pipeline program, the application will probably want to indicate to the host 10 that the pipeline program has completed, such as by the Pipeline Host Signal instruction or interruption circuits (not shown) may be employed.

While the invention has been particularly shown and described with reference to preferred embodiments thereof, it will be understood by those skilled in the art that various from the spirit and scope of the invention.

What is claimed is:

1. In apparatus for processing instruction streams in a pipelined processor with a instruction executing pipeline having a predetermined number of pipeline processing stages, the improvement including, in combination:

each said pipeline processing stage for executing instructions in either a pipeline mode or a parallel mode, each said pipeline processing stage including mode means for executing mode-branch ones of said instructions for switching the mode of the pipeline processing stage between said pipeline and parallel modes;

instruction means for supplying a stream of instructions to the pipeline processing stages, said stream of instructions having instructions in a number of programs up to said predetermined number interleaved in the instruction stream for interleaving execution of instructions from the respective programs in said instruction executing pipeline, respectively;

said instruction means supplying mode-branch instructions for commanding a change in mode of said pipeline processing stage executing a received one of said mode-branch instructions for switching modes of the mode-branch-instruction-executing instruction processing stage;

each of said pipeline processing stages being responsive to executing said mode-branch instructions to actuate the respective mode means to change a mode indicated in the received mode-branch instruction, each said pipeline processing stages mode means having indicating means for storing and indicating said mode in which the instruction processing stage is set to operate;

instruction address means in each of said pipeline processing stages for supplying instruction addresses to the instruction means for fetching instructions to be executed in the respective stages;

global instruction-address incrementing means connected to all of said instruction processing stages for incrementing instruction addresses for all of the instruction processing stages executing instructions in said pipeline mode; and parallel-mode instruction-address incrementing means separate from the global instruction-address incrementing means connected to al of the pipeline processing stages and responsive to the respective pipeline processing stages for indicating instruction execution in the parallel mode to increment the instruction address stored in the respective instruction address means for said pipeline processing stages.

2. In the apparatus set forth in claim 1, further including, in combination:

timing means for supplying stage-indicating timing signals;

first multiplexor means in said global instruction-incrementing means connected to the timing means for responding to the timing signals for multiplexing instruction addresses incremented in the global instruction-incrementing means for being sent to the respective instruction address means in the respective pipeline processing means;

second multiplexor means interposed between the first multiplexor means and all of said pipeline address means of said instruction processing stages and interposed between said parallel-mode instruction-address incrementing means and said instruction address means of said pipeline processing stages, said second multiplexor means being connected to all of said indicating means for actuating the second multiplexor means in response to said timing signals and the respective indicating means indicating said pipeline mode or said parallel for selecting said global or parallel instruction address incrementing means for supplying a next instruction address to the respective one of the pipeline processing stage.

3. In the apparatus set forth in claim 2, further including, in combination:

a global index register for storing a vector indication that includes an indication of a number of repetitions that are to be made in executing a set of instructions to be executed in said pipeline mode;

said instruction means sending a vector load instruction that commands a given one of the pipeline processing stages that sent an instruction-etching address to the instruction means to insert a vector index into said global index register, said global index register being connected to said first multiplexor means for responding to said loaded vector index for inhibiting the first multiplexor means from sending said incremented instruction addresses from said global instruction-address incrementing means to said given one of the pipeline processing stages for said number of repetitions.

4. In the apparatus set forth in claim 3, further including, in combination:

said instruction means sending a given plurality of aid vector load instructions for commanding a given plurality of said pipeline processing stages to load respective vector indexes into said index register for indicating a plurality of said instruction processing stages in said pipeline mode such that said given plurality of said instruction processing stages simultaneously repeat execution of a next instruction supplied to each of said respective given plurality of pipeline processing stages a number of time indicated by the respective vector indexes.

5. In the apparatus set forth in claim 2, further including, in combination:

said mode-branch instructions including a first type of mode-branch instructions for actuating said pipeline processing stages for switching to said parallel mode; and a second type of mode-branch instructions for actuating said pipeline processing stages for switching to said pipeline mode.

6. In the apparatus set forth in claim 5, further including, in combination:

said timing means having a count modulus equal to said predetermined number and continuously cycling through the count modulus in a fixed sequence of counts; and said pipeline processing stages being interconnected from a first pipeline stage to a last pipeline processing stage and being addressable by said timing means in said fixed sequence of said continuously cycling counts, each pipeline processing stage being addressed by a respective one of said counts.

7. In the apparatus set forth in claim 6, further including, in combination:

said second type of modebranch instruction in any of said predetermined number of instruction streams to be executed in said parallel mode being a last instruction in each said streams of instructions to be executed in said parallel mode.

8. In the apparatus set forth in claim 5, further including, in combination:

one of said programs of instructions to be executed in said parallel mode having a pipeline wait instruction;

all of said pipeline processing stages set responding to said wait instruction for not executing any instructions in the pipeline mode until all of said pipeline processing stages executing instructions in said parallel mode complete execution of the respective parallel program, then all of said pipeline processing stages setting their respective modes to said pipeline mode.

9. In the apparatus set forth in claim 8, further including, in combination:

all of said instructions executable in either said parallel or pipeline modes, including said mode-branch instructions, having a same format.

10. In the apparatus set forth in claim 9, further including, in combination:

a global flag means connected to all of said pipeline processing stages for being settable by any one of said pipeline processing stages when executing in the parallel mode; and any one of aid pipeline processor stages that are in said pipeline mode as indicated by its respective indicating means being responsive to a pipeline branch instruction to sense the global flag to perform a branch in a program being executed by said any one pipeline processing stage.

11. In apparatus for operating a pipelined date processing system having a predetermined number of pipeline stages, including, in combination:

each of said pipeline stages having a separate stage program counter, each of the stage program counters for generating instruction addresses independently of any other of the stage program counters;

indicating means in each of said pipeline stages for indicating either a pipeline mode or a parallel mode;

a global program counter connected to all of the stage program counters and for generating instruction addresses for all of said stage program counters; and multiplexor means connected to all of aid indicating means and to all of the program counters and connected to the indicating means for responding to a respective indicating means indicating said parallel mode for selectively enabling the respective stage program counters to generate instruction addresses independently of said global program counter and for enabling said program counters in said pipeline stages with the respective indicating means indicating said pipeline mode to receive said instruction addresses from said global program counter via said multiplexor means such that said pipeline stages indicated as being in said pipeline mode receive instruction addresses supplied by the global program counter for executing instructions in a sequence determined by the global program counter simultaneously with ones of said pipeline stages indicating said parallel mode generating instruction addresses independently of said global program counter;

program means connected to all of said stage program counters of said pipeline stages; each said stage program counters supplying said instruction addresses to said program means;

said program means responding to the supplied instruction addresses for supplying instructions identified by said instruction addresses to the respective pipeline stages;

said supplied instructions including mode-changing instructions, each of the mode-changing instructions including an indication of a commanded mode; and said pipeline stages being responsive to said mode-changing instructions to alter the respective indicating means mode indications to said commanded mode.

12. In the apparatus set forth in claim 11, further including, in combination:

vector means for storing a vector index and being connected to the multiplexor means and to the pipeline stage, said vector index including an indication of a number of repetitions that are to be made in executing a set of instructions to be next executed in said pipeline mode;

said program means sending a vector load instruction in response to an instruction address received from a given one of the pipeline stages, said vector load instruction commanding said a given one of the pipeline processing stages to insert a predetermined vector index into global index register;

said global index register being connected to said multiplexor means for responding to said loaded vector index for inhibiting the multiplexor means from sending said generated instruction addresses from said global instruction-address incrementing means to said given one of the pipeline processing stages for said indicated number of repetitions whereby an instruction identified by one of said instruction addresses is repeatedly executed.

13. In a machine-effected method of operating a pipelined data processing apparatus having a predetermined number of pipeline stages, including the machine-executed steps of:

establishing each of said pipeline stages to execute instructions in either a pipeline mode or a parallel mode;

in each said pipeline stage indicating a current mode for executing instructions as being either parallel mode or said pipeline mode;

supplying a stream of instructions from an instruction means to the pipeline stages for executions respectively in said pipeline stages, including instructions in said stream of instructions from a plurality of programs, said pipeline simultaneously executing instructions from said plurality of programs up to said predetermined number of said programs;

supplying from said instruction means in any one or more of said plurality of programs a mode-branch instruction to one of the pipeline stages for changing the current mode of the one pipeline stage to a mode commanded in said supplied mode-branch instruction, each said mode-branch instruction including an indication of a change of mode to either said parallel or pipeline mode;

from each of said pipeline stages supplying instruction-fetching instruction addresses to the instruction means for fetching instructions to be executed in the respective pipeline stages that supplied said instruction-feeding instruction addresses;

incrementing in a global counter instruction addresses for generating pipeline instruction addresses to be used to fetch instructions from said instruction means by respective ones of said pipeline stages in said pipeline mode supplying said pipeline instruction addresses to said pipeline stages having said pipeline mode, respectively; and respectively incrementing instruction addresses for all of the pipeline stages indicating said parallel mode for generating parallel instruction addresses to be used by said pipeline stages in said parallel mode.

14. In the machine-effected method set forth in claim 13, further including the machine-effected steps of:

sending a vector load instruction from said instruction means that commands a given one of he pipeline stages that sent an instruction-fetching address to the instruction means to insert a vector index into a global index register, in response to said vector load instruction, from said given one of the pipeline stage sending and storing a vector indicator in a global vector register and including in said vector indicator an indication of a given number of repetitions a next instruction is to be executed; and receiving from said instructions means a next instruction at said one pipeline stage, during said given number of repetitions, inhibiting sending any incremented instruction addresses from said global counter to said one pipeline stage for repeating execution of said next instruction for said given number of times.

15. In the machine-effected method set forth in claim 14, further including the machine-effected steps of:

selecting a same format of instruction words for all of said instructions.

16. In the machine-effected method set forth in claim 15, further including the machine-effected steps of:

before supplying said instructions from the instruction means to the pipeline stages, initializing all of the pipeline stages in the pipeline apparatus to execute instructions in said pipeline.

17. In the machine-effected method set forth in claim 16, further including the machine-effected steps of:

including a pipeline wait instruction in one of said programs of instructions being executed by one of said pipeline stages in said parallel mode;

responding to said pipeline wait instruction for actuating all of the pipeline stages in said pipeline mode to not execute any instructions in the pipeline mode.

actuating all of said pipeline stages executing instructions in said parallel mode to complete execution of the respective program being executed in said parallel mode, then as each of the pipeline stages complete execution of the respective programs in the parallel mode, switching the respective completing pipeline stages to the pipeline mode; and sensing that all of the pipeline stages are in said pipeline mode and then restart executing instructions in all the pipeline stages in said pipeline mode.

18. In a machine-effected method of operating a pipeline data processing apparatus, a plurality of pipeline stages in the pipeline data processing apparatus, means in the data processing apparatus for sequencing instruction execution in said pipeline stages in a pipelined sequence, each of the pipeline stages for executing instructions fetched from an instruction means, including the machine-executed steps of:

in each of said pipeline stages indicating either a pipeline mode or a parallel mode for fetching and executing instructions;

generating first instruction addresses in a global counter for respective ones of said pipeline stages indicating the pipeline mode, supplying said generated first instruction addresses to said respective ones of said pipeline stages indicating the pipeline mode as instruction fetching addresses;

generating second instruction addresses in each of said pipeline stages indicating the parallel mode, storing said generated second instruction addresses in each said respective pipeline stages indicating the parallel mode as instruction fetching addresses;

supplying from each of said pipeline stages said respective instruction fetching address to the instruction means for fetching an instruction from the instruction means to be executed in the pipeline apparatus by said respective pipeline stage;

from said instruction means, supplying instructions to the respective pipeline stages fetched from the respective instruction fetching address; and executing each supplied instruction in the respective pipeline stage.

19. In the machine-effected method set forth in claim 18, further including the machine-effected steps of:

generating a vector index; and repeatedly executing a next instruction in the pipeline mode a number of times indicated by the generated vector index and indexing the data addresses of the instruction with each execution thereof whereby vector calculations are performed in said pipeline mode.

20. In apparatus for processing instruction streams in a pipelined processor with a instruction executing pipeline having a predetermined number of pipeline processing stages, the improvement including, in combination:

each said pipeline processing stage for executing instructions in either a pipeline mode or a parallel mode, each said pipeline processing stage including mode means for executing mode-branch ones of said instructions for switching the mode of the pipeline processing stage between said pipeline and parallel modes;

instruction means for supplying a stream of instructions to the pipeline processing stages, said stream of instructions having instructions in a number of programs up to said predetermined number interleaved in the instruction stream for interleaving execution of instructions from the respective programs in said instruction executing pipeline, respectively;

said instruction means supplying mode-branch instructions for commanding a change in mode of said pipeline processing stage executing a received one of said mode-branch instructions for switching modes of the mode-branch-instruction-executing instruction processing stage; and each of said pipeline processing stages being responsive to executing said mode-branch instructions to actuate the respective mode means to change a mode indicated in the received mode-branch instruction, each said pipeline processing stages mode means having indicating means for storing and indicating said mode in which the instruction processing stage is set to operate.

* * * * *

UNITED STATES PATENT AND TRADEMARK OFFICE
CERTIFICATE OF CORRECTION

PATENT NO. : 5,261,063
DATED : November 9, 1993
INVENTOR(S) : J. Kohn et al.

It is certified that error appears in the above-indentified patent and that said Letters Patent is hereby corrected as shown below:

```
Column 21, line  6, after "various", insert -- changes in form
and details may be made therein without departing --.
Column 22, line 38, delete "aid", insert -- said --.
Column 23, line 35, delete "aid", insert -- said --.
Column 23, line 41, delete " date", insert -- data --.
Column 23, line 55, delete "aid", insert -- said --.
Column 25, line 22, delete "he", insert -- the --.
Column 25, line 46, after "pipeline", insert -- mode --.
Column 26, line 24, delete "address", insert -- addressess --.
```

Signed and Sealed this

Thirtieth Day of August, 1994

Attest:

BRUCE LEHMAN

*Attesting Officer*   *Commissioner of Patents and Trademarks*